(12) United States Patent
Westergaard

(10) Patent No.: US 8,938,322 B2
(45) Date of Patent: Jan. 20, 2015

(54) APPARATUS AND METHOD FOR CONTROLLING CONSUMER ELECTRIC POWER CONSUMPTION

(76) Inventor: Henrik Westergaard, Folsom, CA (US)

( * ) Notice: Subject to any disclaimer, the term of this patent is extended or adjusted under 35 U.S.C. 154(b) by 0 days.

(21) Appl. No.: 13/373,963

(22) Filed: Dec. 6, 2011

(65) Prior Publication Data

US 2012/0150359 A1    Jun. 14, 2012

Related U.S. Application Data

(60) Provisional application No. 61/459,068, filed on Dec. 6, 2010, provisional application No. 61/519,901, filed on Jun. 1, 2011.

(51) Int. Cl.
*H02J 3/14* (2006.01)

(52) U.S. Cl.
CPC .............. *H02J 3/14* (2013.01); *H02J 2003/143* (2013.01); *Y02B 70/3225* (2013.01); *Y04S 20/222* (2013.01); *Y04S 20/242* (2013.01); *Y02B 70/3266* (2013.01)
USPC ............ 700/291; 700/295; 700/296; 700/292

(58) Field of Classification Search
None
See application file for complete search history.

(56) References Cited

U.S. PATENT DOCUMENTS

| | | | | |
|---|---|---|---|---|
| 3,652,838 A * | 3/1972 | Dillon et al. | | 700/295 |
| 4,075,699 A * | 2/1978 | Schneider et al. | | 700/291 |
| 4,146,923 A * | 3/1979 | Borkan | | 700/296 |
| 4,324,987 A * | 4/1982 | Sullivan et al. | | 307/35 |
| 4,336,462 A * | 6/1982 | Hedges et al. | | 307/35 |
| 4,549,274 A * | 10/1985 | Lerner et al. | | 700/295 |
| 5,572,438 A * | 11/1996 | Ehlers et al. | | 700/295 |
| 6,018,690 A * | 1/2000 | Saito et al. | | 700/295 |
| 6,301,674 B1 * | 10/2001 | Saito et al. | | 713/340 |
| 6,487,509 B1 * | 11/2002 | Aisa | | 702/62 |
| 6,891,478 B2 * | 5/2005 | Gardner | | 340/635 |
| 7,130,719 B2 * | 10/2006 | Ehlers et al. | | 700/276 |
| 7,343,226 B2 * | 3/2008 | Ehlers et al. | | 700/276 |
| 7,373,222 B1 * | 5/2008 | Wright et al. | | 700/295 |
| 7,376,490 B2 | 5/2008 | Ueno et al. | | |
| 7,379,997 B2 * | 5/2008 | Ehlers et al. | | 709/224 |
| 7,418,428 B2 * | 8/2008 | Ehlers et al. | | 705/63 |
| 7,516,106 B2 * | 4/2009 | Ehlers et al. | | 705/412 |
| 7,580,775 B2 * | 8/2009 | Kulyk et al. | | 700/296 |
| 7,991,513 B2 * | 8/2011 | Pitt | | 700/295 |
| 8,148,924 B2 * | 4/2012 | Ohkuwa et al. | | 318/34 |
| 2009/0018705 A1 * | 1/2009 | Ouchi et al. | | 700/291 |

(Continued)

*Primary Examiner* — Kavita Padmanabhan
*Assistant Examiner* — Christopher E Everett
(74) *Attorney, Agent, or Firm* — Brian K. Johnson, Esq., LLC

(57) ABSTRACT

A computer-based electrical power management and allocation system is provided that collects demand for electric power usage and allocates electric power supply in satisfaction thereof. A load control server is used to collect and schedule electrical power start requests according to policies established by either or both of the electric power consumers and electric power suppliers. The energy system collects electrical power start requests and holds them in a reservation pool for later satisfaction according to prescribed customer and supplier policies and according to an overall optimization criterion of the energy system. Start messages are then subsequently issued to begin device operation once the energy system's operational criterion is relaxed and the devices are then removed from the reservation pool. Similar queuing for later satisfaction may also be applied to the distribution of other utilities, such as water, natural gas, or guaranteed interne bandwidth.

22 Claims, 11 Drawing Sheets

(56) References Cited

U.S. PATENT DOCUMENTS

| | | |
|---|---|---|
| 2009/0234511 A1 | 9/2009 | Ouchi et al. |
| 2010/0019575 A1* | 1/2010 | Verges ............................ 307/38 |
| 2011/0054710 A1* | 3/2011 | Imes et al. .................... 700/286 |
| 2012/0083930 A1* | 4/2012 | Ilic et al. ....................... 700/287 |
| 2012/0120306 A1* | 5/2012 | Schindler et al. ............. 348/372 |

* cited by examiner

APPARATUS AND METHOD FOR CONTROLLING CONSUMER ELECTRIC POWER CONSUMPTION

CROSS REFERENCE TO RELATED APPLICATIONS

This application claims priority to the U.S. Provisional Patent Application Ser. No. 61/459,068, titled "Apparatus and Method for Managing Consumer Electric Power Consumption," filed on Dec. 6, 2010 and Ser. No. 61/519,901, titled "Apparatus and Method for Managing Consumer Electric Power Consumption," filed on Jun. 1, 2011 the contents of each of which are herein incorporated by reference in their entirety.

STATEMENT REGARDING FEDERALLY SPONSORED RESEARCH OR DEVELOPMENT

Not applicable.

BACKGROUND OF THE INVENTION

The disclosure relates generally to an electric power management system and method of operating the same. More specifically, the disclosure relates to pooling of electric power requests according to various criteria for a subsequent, highly-ordered satisfaction of the same by the electric power utility providing the electric power to the devices.

Electric service providers face an ever increasing demand for electricity. However, this demand is not static and may vary significantly over any given period of time. Even within commonly-defined time periods, the demand for electricity can vary significantly, such as within one day, between two or more days or weeks, or throughout the seasons or the calendar year. Consequently, electric service providers need to match their supply with the dynamic demand by producing or buying more electricity than is needed in order to be able to meet peak demands. In turn, often means that coal plants, gas turbines etc. have to be brought on-line (started up) or taken off-line (stopped) as needed, which may in turn result in those plants being operated even though the peak dynamic electric power demand isn't continuously present. This is wasteful of energy producing resources since excess electricity must be stored until a rise in demand is presented. Even less desirable, the electric power company may be forced to sell the excess power supply at a loss.

On a smaller scale, certain operational control systems exit that provide electric power to a plurality of power consumption systems by combining expected power consumption for each such consumption system and adjudicating the power supplying power to the plurality based on the total expected power consumption. U.S. Pat. No. 7,376,490, issued to Ueno et al., provides such a system in the context of semiconductor wafer fabrication facility. In the system of Ueno et al., certain power consuming devices have high dynamic power spikes during certain phases of their operation as part of the wafer fabrication process. The problem with this is that certain power margins at the power supply need to be ensured, meaning either that that the power supplies need to be large, and consequently expensive, to handle the large dynamic spikes or all the devices cannot be operated without coordination. The Ueno et al. invention solves this problem using an expected operational start time decision unit that manages the overall expected power consumption of the plurality of power consumption devices and delaying temporary operational start times of an idling power consumption system as needed so as to maintain the required power margin of the power supply.

In other existing systems, the operation time of specific devices are altered by an electric demand control device in which a power consumption integrated value for each of a plurality of power consuming devices is calculated. Two U.S. Pat. Application Pubs., No. 2009/0234511A1 and 2009/0018705—both to Ouchi et al., disclose such a unit. In the Ouchi et al. applications, integrated power consumption integrals of power consuming devices are used to predict the operation of those devices in the presence of an environmental condition that alters their otherwise steady-state power requirements. Ouchi et al. then evaluates total power consumption of all such devices within operational time zones in view of these power consumption predicted values and changes the operational times of the units if the total power consumption exceeds a target within any particular time zone.

None of these systems solve the more complex problem of managing a pool of electrical consuming devices in a coordinated and controlled manner where those devices are demanding electrical service within an entire electric power grid. Thus the need exists to provide for a dynamic allocation and control mechanism according to the present invention so as to reduce economic inefficiencies within the overall electric power supply and distribution system. Further, associated consumer efficiencies and cost optimization may also be realized simultaneously with the present invention.

BRIEF SUMMARY OF THE INVENTION

The present invention provides for a computer-implemented electric power distribution system, each of the computers within the system including a processor and associated memory from which computer instructions are executed by an associated processor, the system includes: an electric power customer having a device that consumes the electric power, the device being scheduled to start according to a policy set by the customer; an electric power provider for supplying the electric power to the device; and a load control computer system coupled to the customer and the provider, the load control computer system and having an active pool containing devices that have been started for the customer and a reservation pool for holding devices that have not been started for the customer, the load control computer system establishing an active pool parameter according to which the active pool operation is evaluated, the load control computer system receiving a start request message from the device after being scheduled to start, the load control computer system placing the device in the reservation pool for starting the device in compliance with the customer policy and the active pool parameter, the load control computer system processing the start request by moving the device from the reservation pool to the active pool when the customer policy is satisfied and the active pool parameter is satisfied and sending a start message to the customer so as to start the device.

In several preferred embodiments of the system, the customer policy includes one of: a price policy, a latest device start time, a guaranteed finish time, an energy source preference, and a local energy source preference. Further, the active pool parameter is one of: an ideal electric power load level, an energy source preference, an electricity price limit, a margin between a maximum electrical load and an actual electrical load, and a geographic load consideration; and the active pool parameter is an ideal electric power load provided by the provider and the active pool parameter is satisfied when a total power for all devices within the active pool is within a range of the ideal electric power load. In another aspect, the devices with outstanding start requests within the reservation pool are processed on a first-come, first-served basis; the customer policy overrides the first come, first served processing; and unprocessed devices within the reservation pool are processed according to a latest device start time and a subset of the devices in the reservation pool having outstanding start requests are processed when the electric power price changes. Further, the load control computer accounts for a load curve in determining whether the customer policy is satisfied. Finally, the system includes a supplier policy, the supplier policy including one of: a customer type, a geographic preference, a price policy, an energy source preference, and an environmental consideration.

According to another preferred embodiment an electric power load control system is provide in which each of the computers within the system includes a processor and associated memory from which computer instructions may be executed by the processor, the system includes: a load control computer system coupled to an electric power customer having a device that consumes electric power, the device being scheduled to start according to a policy set by the customer; the load control computer system also coupled to a provider from which it receives electric power supply, the load control computer system having an active pool containing devices that have been started for the customer and a reservation pool for holding devices that have not been started for the customer, the load control computer system establishing an active pool parameter according to which the active pool is operated operation is evaluated, the load control computer system receiving a start request message from the device after being scheduled to start, the load control computer system placing the device in the reservation pool for starting the device according to the customer policy and the active pool parameter, the load control computer system processing the start request by moving the device from the reservation pool to the active pool when the customer policy is satisfied and the active pool parameter is satisfied, and sending a start message to the customer so as to start the device.

According to a preferred method of the present invention, a method of scheduling electrical power distribution is provided within an electric power distribution system using a computer-implemented electric power load control system, each of the computers within the load control system including a processor and associated memory from which computer instructions may be executed by the processor, the load control computer system coupled to an electric power customer having an device that consumes electric power, the device being scheduled to start according to a policy set by the customer; the load control computer system also coupled to a electric power provider from which the electric power distribution system receives electric power, the load control computer system having an active pool containing devices that have been started for the customer and a reservation pool for holding devices that have not been started for the customer, the load control computer system establishing an active pool parameter for the operation of the active pool, the method includes: receiving at the load control computer system a start request message from the device after being scheduled to start; placing the device in the reservation pool for starting the device according to the customer policy and the active pool parameter; processing the request by moving the device from the reservation pool to the active pool when the customer policy is satisfied and the active pool parameter is satisfied; and sending a start message to the customer to start the device.

According to different aspects of the method, the step of processing includes the steps of establishing a range of operation about the active pool parameter and determining that the active pool parameter is satisfied when the movement of the device to the active pool allows the active pool to operate within the range. Further, the step of placing includes the step of ordering the device for processing within the reservation pool in a first-come, first-served basis. Also, the step of ordering includes the step of overriding the first-come, first-served basis based upon a latest start time in the customer policy. Finally, another aspect of the method provides for a computer-readable media having executable instructions for performing the above-mentioned method steps.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention.

It is also to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the internet.

In this application, reference to ZigBee™ is used as referring to a specification for a suite of high level, communications protocols. The standards to which the ZigBee™ groups adhere include the IEEE 802.15.4 networking standard, among others. In sum, ZigBee™ specifies a low-cost, low-power, wireless mesh network standard for deploying wireless control and monitoring applications to electrical devices. Although the ZigBee™ specification provides one example of an intelligent appliance/metering standard for controlling and monitoring the powering of electrical devices, it is not the only communications standard that will work within the below-described invention. HomePlug™, for example, provides another communication protocol for providing the smart connections required by the present invention. It should be appreciated that other standards, presently defined or later developed, may also be used within the general operational context of the invention.

Figure 1:
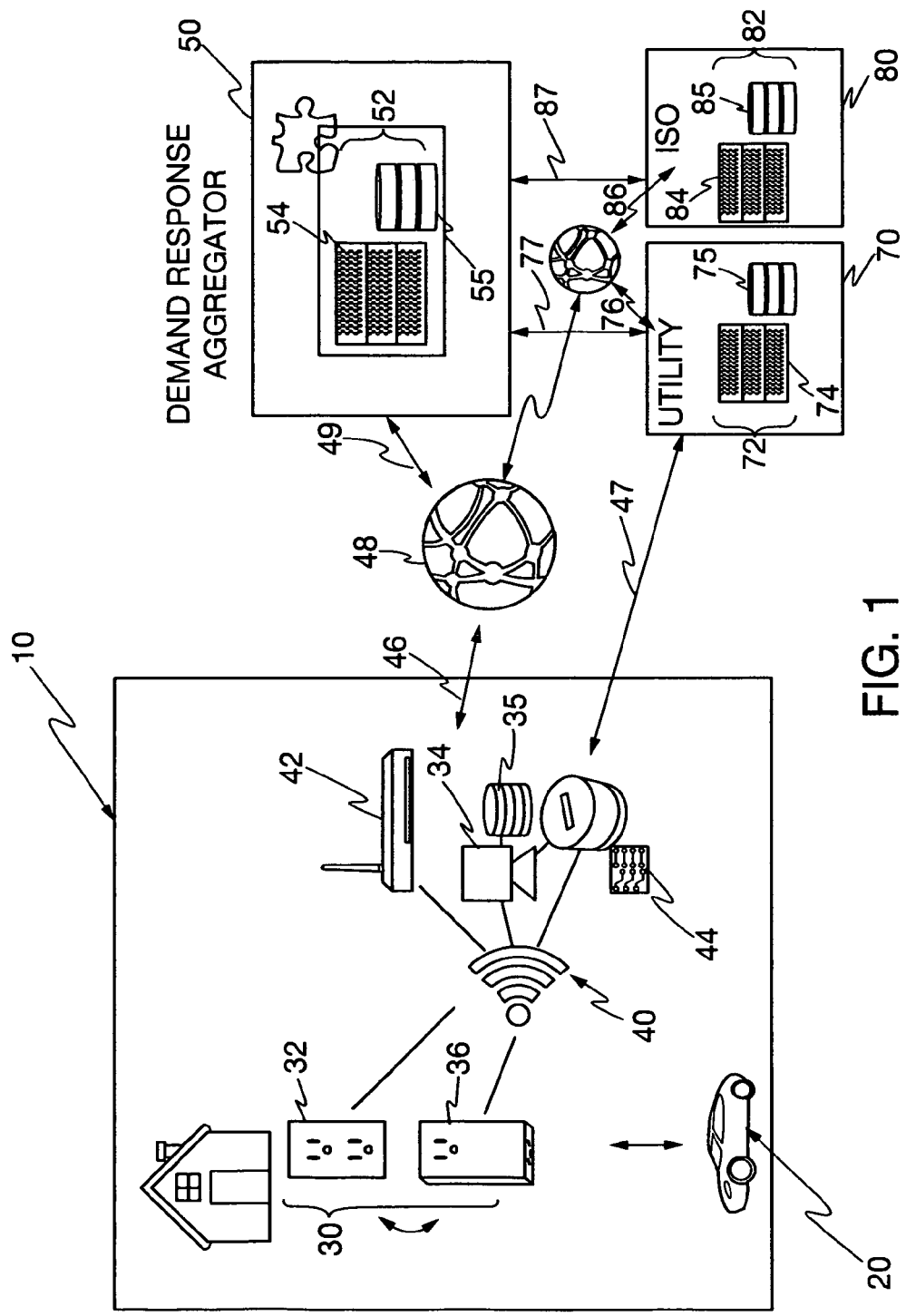
FIG. 1 is a block diagram of the environment in which the system of the present invention operates.

FIG. 1 is a block diagram showing the general environment in which the present invention operates. Premises 10 is a location at which electrical devices 20 are sited. Premises 10 may be a privately-owned residence, or a business residence/campus, or even an outdoor location at which the electrical devices 20 are sited and require electric power to operate. Premises 10 includes electrical outlets 30 which may include standard wall receptacles 32 or other specialized outlets 36, such as a ZigBee™-enabled socket. The electrical devices and their connected outlets are coupled for communication network through an on-premises network 40 to either a networked device (i.e. a gateway 42 or computer server 34), or alternatively, to a specialized electrical meter 44, such as a ZigBee™-enabled meter. Premises computer system 34 and associated database 35 may serve as an intermediary connection point within premises network 40 for coupling to networked device 42 or specialized electrical meter 44. The gateway 42 is connected through connection 46 to the internet 48. In the case of connection to the specialized meter 44, the meter is connected to the electric power utility 70 via the utility network 47 which may include the actual power supply feeds for powering the electrical devices. Electric power companies that constitute the electrical utility may by organized, operated and/or governed by an Independent System Operator (ISO) 80. The utilities and ISOs, both referred to as electrical power suppliers herein, have their own computer facilities, 72 and 82 respectively, which include computers 74 and 84 and databases 75 and 85 respectively. Further, these computer facilities are connected to the internet 48 through connections 76 and 86. Finally, a plurality of utilities and ISOs may also be accommodated in the overall system shown in FIG. 1

It should be appreciated that in the cases in which non-specialized outlets are used, either the electrical devices themselves or associated adapters would include the computer-based capability for executing the steps of and accommodating the aspects of the invention as described below. In one preferred communication mechanism between the gateway/smart meter and the electric devices, a programmable adapter is placed between the electrical device and the electrical outlet. This programmable adapter may communicate according to the ZigBee™ or HomePlug™ networking standards or other similar protocol. In another preferred communication coupling arrangement, the electrical devices themselves may have embedded standard communication protocols within the actual devices, such those of ZigBee™ or HomePlug™.

Demand response aggregator (DRA) 50 also includes dedicated computer facilities 52 including computer servers 54 and coupled databases 55. DRA 50 is connected, generally, to the internet 48 through connection 49 and may also be specifically connected to the utilities 70 and the ISOs 80 via dedicated connections 77 and 87 respectively. The DRA works generally through software-controlled programming present on the computer systems. According to one particularly preferred embodiment of the invention, the software control enables electrical power consumers and electric power service providers (e.g. utility companies, municipalities etc.) to attempt to control and maintain a certain electric power load level. Electrical devices requiring power may be pooled for later than immediate power consumption according to various attributes set by the user and/or the electric power providers.

In operation, electric power consumers specify policies regarding the provision of their electrical power service. Policies may be set up for each individual device, or group policies may be specified for groups of devices as specified by the consumer. The consumer uses the software of the present invention via the on-premises computer 31 to communicate these policies to the DRA, e.g. through a web interface, mobile application, or other suitable software interface. Through these interfaces, the consumer can configure each registered device via web applications. Registered local smart sockets are visible and the smart appliance server can be verified as having registered a smart socket or smart appliance. Depending on the type of appliance or device plugged into the smart socket, the server will also provide some device specific configuration parameters like: latest start time, temperature interval, finished before time, and interval runtimes. Alternatively, policy selections may be enabled for input or modification directly on the embedded device interfaces or the smart sockets. For example, the consumer can use programmable interfaces on or in front of the device (e.g. programmable adapters, or ZigBee™ enabled outlet or other device with similar interfaces) to specify the operational price point, start/stop time or other condition upon which the user desires to schedule the device use. In any case, the policies are created or modified at the customer premises and communicated to the DRA via the network connections 46 and 49. They are then received by the DRA and stored on the computer systems 54 and databases 53 for future use as described below. To complete the policy specification and information transfer, all the electrical devices to be controlled in this manner also register themselves with the DRA and this registration information is stored in databases 55. This device registration may either be accomplished through customer-driven input or provided automatically through the ZigBee™-enabled network. Ultimately, the customer policies and the specific data regarding the devices to be controlled are transferred to the DRA and stored in its databases such that the policies may be executed with respect to those devices.

With respect to physical location of the component pieces of the present invention, the DRA server may be located in a separate DRA facility, in the back office of the utility/ISO location or may also be hosted at a third-party server location. Alternatively, a more secure arrangement is envisioned in which a portion of the computational needs and associated databases/reservation pool information is housed at the customer site, with a complementary setup being housed at the DRA and/or utility/IOS location. This arrangement provides more privacy and protection for consumer sensitive data; data which the customer may only wish to share with entities other than the electric service providers and DRA (e.g. equipment manufacturers, repair facilities, etc.). In the end, the location of the invention components is not as critical as the real-time interface and interconnection capabilities provided in accordance with the description below. Ultimately, the ideal distribution of the overall system resources and data will likely depend on standards that are adopted concerning the home/industry interfaces, the numerous communications and interactions between customer facility management and external service providers, and the customers' needs in connection with the same.

Examples of specific customer policies include specifying a preferred pricing determined by a dynamic pricing schedule or specifying a latest start time for an electric power consuming device. In the first instance, the customer-specified policy sets a specific price point that the customer is willing to pay for the electric power supplied to a specific device or group of devices. As one specific example, the consumer may choose a "super saver profile" in which certain high demand devices (e.g. dishwasher, dryers) are only started at off peak hours while other, higher demand devices (e.g. electric cars) are delayed for starting in the middle of the night at the lowest rates. Where customer policies are provided specifying a timing preference, the customer's price concerns may be overridden by other policy selections, such as specifying when the customer wants the device to finish. In doing so with respect to the electric car example, the consumer would presumably realize that he will want (need) his electric vehicle to be charged by the morning, but that he doesn't need to charge it at any particular time prior to its intended use. Therefore, the consumer may avoid higher electricity prices by delaying the charging or even allow the electrical power provider to decide when to start the charging based on the electrical load, e.g. when it drops later in the evening or later that night. This will result in an overall lower price to charge the device(s). To complete the electric car example, that car might first start charging around 1:00 AM, when the electrical demand is exceptionally low, but the overarching policy criteria that the car should be finished charging at 6:00 AM may override such preferences. Other devices, like washers and driers, might have policy rules that specify an earlier start, i.e. at a higher price point than the lowest midnight price, but still lower than the peak midday hour prices. In doing so, the consumer may thereby be provided lower than peak rates while maintaining the option of using these devices again at even lower rates later in the evening. As a final policy consideration, each device can, of course, still be scheduled for immediate start thereby overriding all other policy considerations. In this case, however, the device would be consuming electricity at the instantaneous delivery price point.

Just as the user may set certain policy configurations for the operation of their electricity consuming devices, the present invention also accommodates electric service provider policy configurations for scheduling the operation of a group of electricity consuming devices in the aggregate. In this regard, the electric power provider may even intervene so as to decide when they want certain devices to start based on the electric power supplier's current total electric power load, an estimated future load, a desired target load, the current set of pooled electric power consuming devices, or a current (or scheduled) electricity price. In some instances, these restrictions may be permissive and constrained by the municipality, consumers, or ISOs. In fact, the ability of the service provider to specify such policies may, itself, be a configurable attribute according to the present invention. When so permitted, the electric utility would then be able to provide power to a group of devices or appliances which are waiting for service based on the customer-specified policy as conditioned by the service provider policy. In one such application, it is envisioned that during peak power demand cycles in hot climates, air conditioners may be allowed to be service constrained by electric utilities for operation only for certain durations, or only for certain periods of the day or possibly on a geographic, rolling provisioning basis. As with the customer-specified policies, the electric power supplier 70 or ISO 80 uses the software of the present invention, via their respective computer systems, to communicate these policies to the DRA through a suitable software interface. Utility/ISO policy selections may be enabled for input or modification directly within the appropriate business locations or remotely through the interne connections from government offices.

Figure 2:
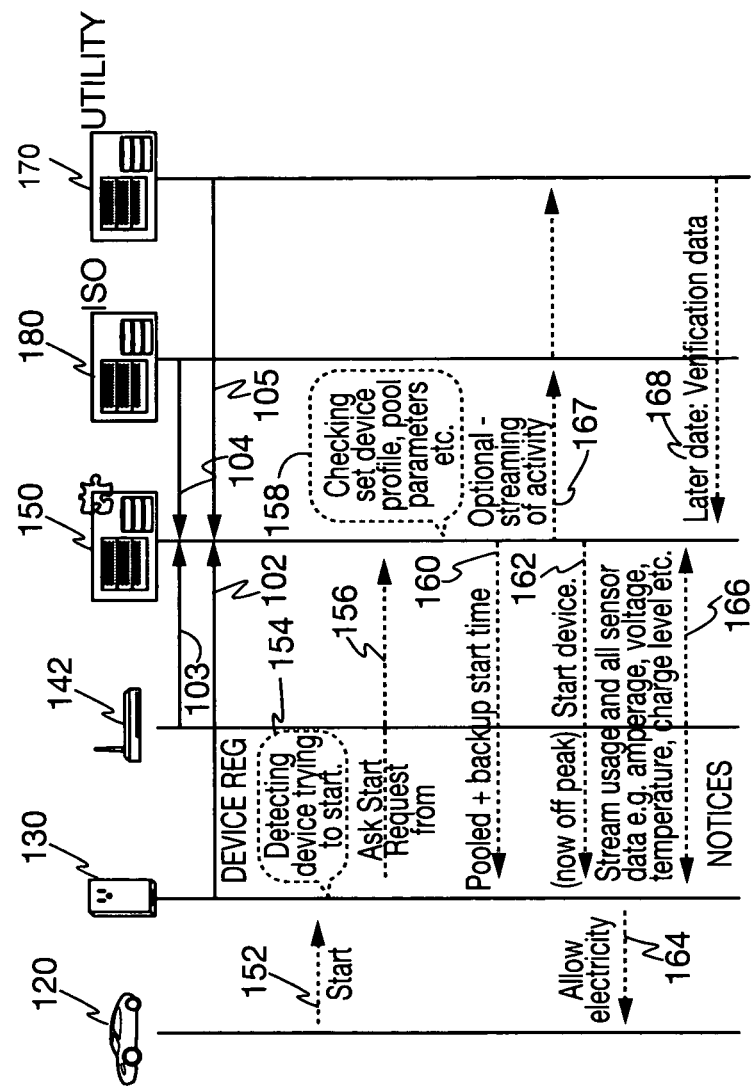
FIG. 2 is a message flow diagram according to a preferred embodiment of the present invention.

Thus, per the policy specification process described above, electrical power consumption may be conditioned according to various criteria contained within policies specified by either or both of the electrical power consumer or service providers. Referring to FIG. 2, the device registration step is shown at 102 in the transmission step from smart socket 130 to DRA 150. The customer policy specification step is shown at 103 in the transmission step from gateway 142 to DRA 150. Finally the service provider policy specifications steps (if any) are shown at 104 in the transmission step from the ISO 180 and at 105 in the transmission step from the utility 170, both to DRA 150.

The operation of the DRA in view of these policy constraints will now be discussed. In one particularly preferred embodiment provided below, an ideal electricity load is maintained by the DRA. Alternatives to this follow the specific detailed description.

FIG. 2 provides a simplified process diagram according to the present invention. In the specific operational example of FIG. 2, an electrical power consuming device 110 that wants to start consuming power from an electrical outlet 130 may be plugged in (step 152). The smart outlet 130 detects that the device is requesting the start of electrical service (step 154) and sends a start request message (step 156), via gateway 142 to the DRA. 150. This message may also be transmitted via the on-premises computer. The DRA then evaluates the following elements (step 158): a) the device profile as previously registered with the DRA, b) the customer policies governing that device and provided to the DRA, c) the service provider policies (if any) provided to the DRA, and d) the pool parameters of the DRA. A pool parameter, as used herein, is a particular criterion or condition according to which the electrical service provision is optimized by the DRA. In the example described below, the pool parameter is an ideal electrical load. Presuming that the device is not specified for an immediate start, the DRA places the device to be serviced in a reservation pool and determines a future start time at which the start request will be satisfied based on the evaluation of the sum of these elements (step 160). Messaging reports provide this information back to the customer. Once the conditions of the customer policy, the service provider policy (if any) and the pool parameter are satisfied, a start message is sent (step 162) to the smart outlet 130 (or coupled on-premises computer) and electricity is permitted to flow to the requesting device (step 164). In the example of FIG. 2, these conditions are satisfied when the off peak time begins and at which a lower-priced electric service is available.

Also shown in FIG. 2 are additional steps that operate in concert with the above-provided method. Optional step 167 provides for data streaming from DRA 150 to ISO 180 or utility 170 for providing original customer data for security and audit purposes. Optional step 168 provides for verification data such as meter readings and other supplier generated data to be sent from utility 170 to the DRA 150. Finally, optional step 166 provides for data streaming from smart socket 130 to DRA 150 for reporting of certain device data, operating criteria, notices etc. as described in more detail below.

Figure 3A:
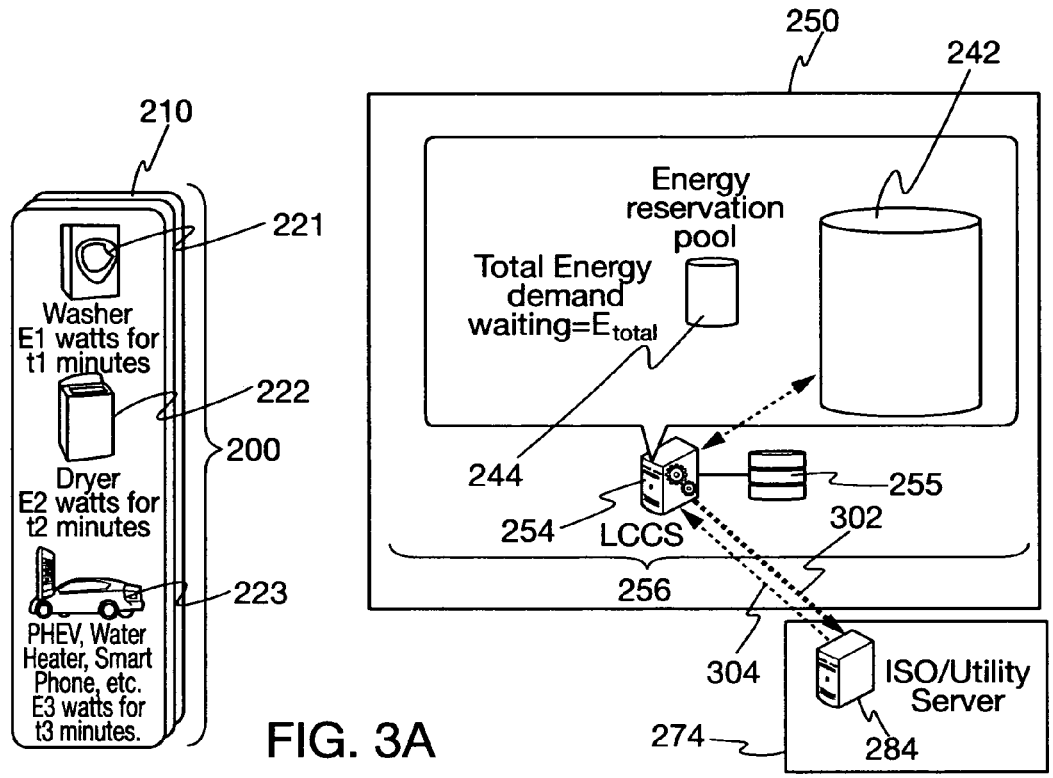
FIGS. 3A-3R are a sequence of figures showing the processing of electrical power requests according a preferred embodiment of the present invention.
Figure 3B:
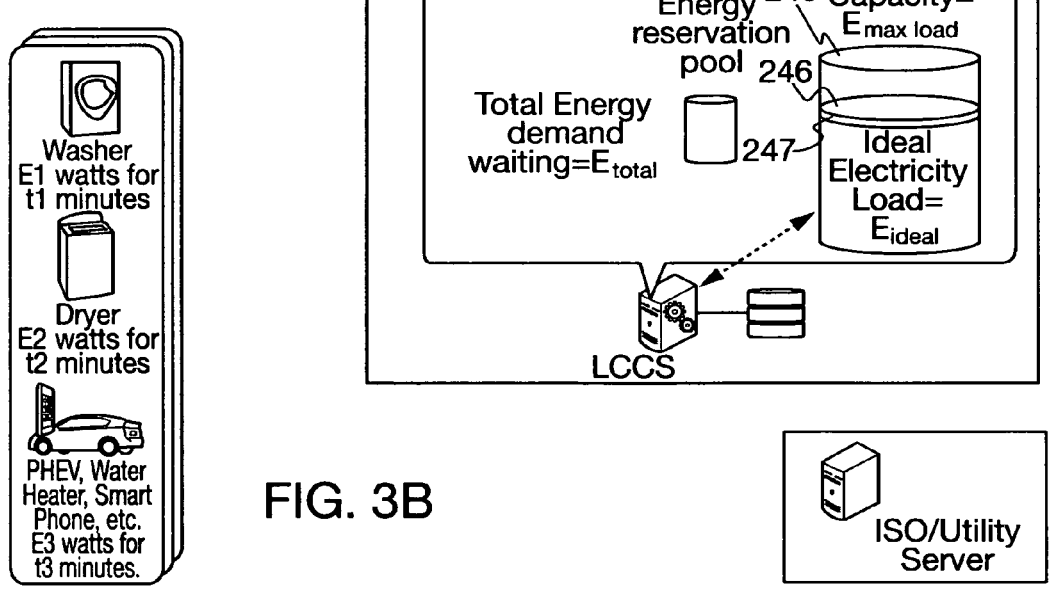
Figure 3C:
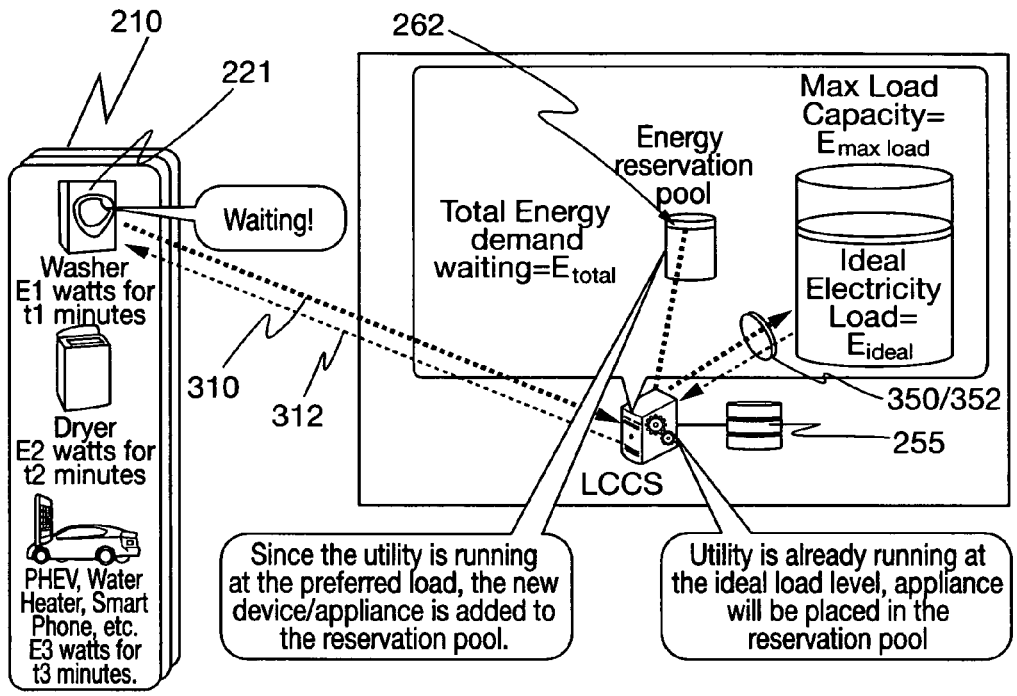
Figure 3D:
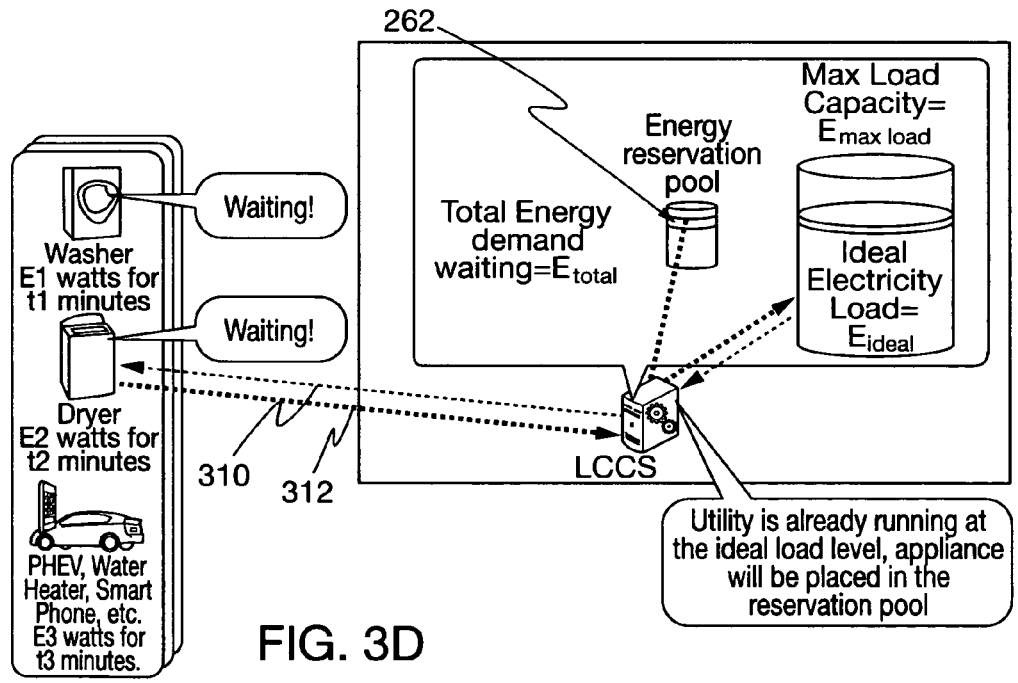
Figure 3E:
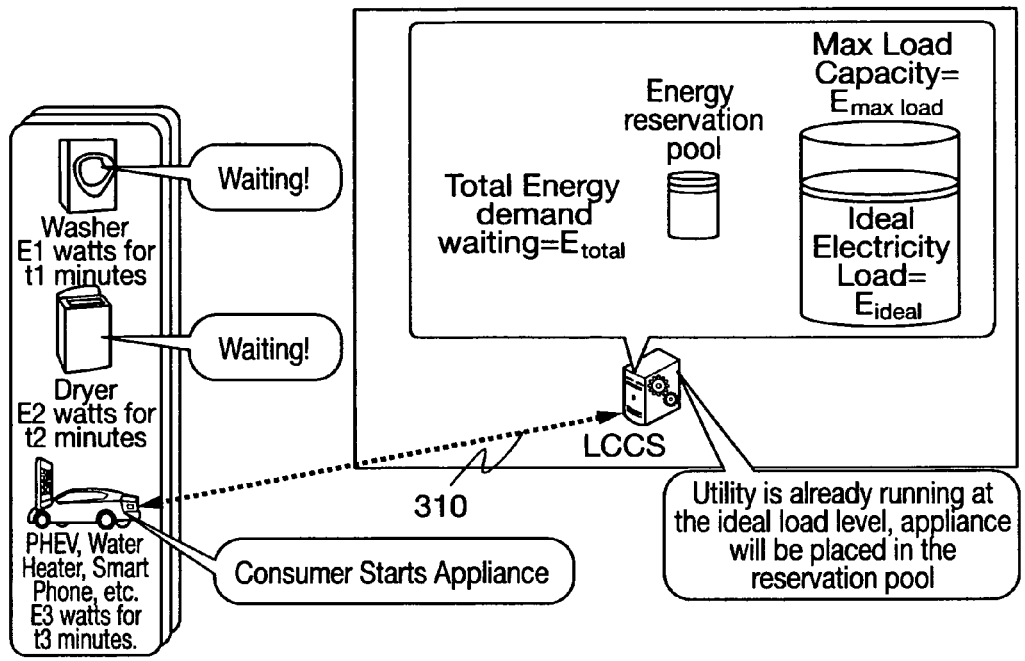
Figure 3F:
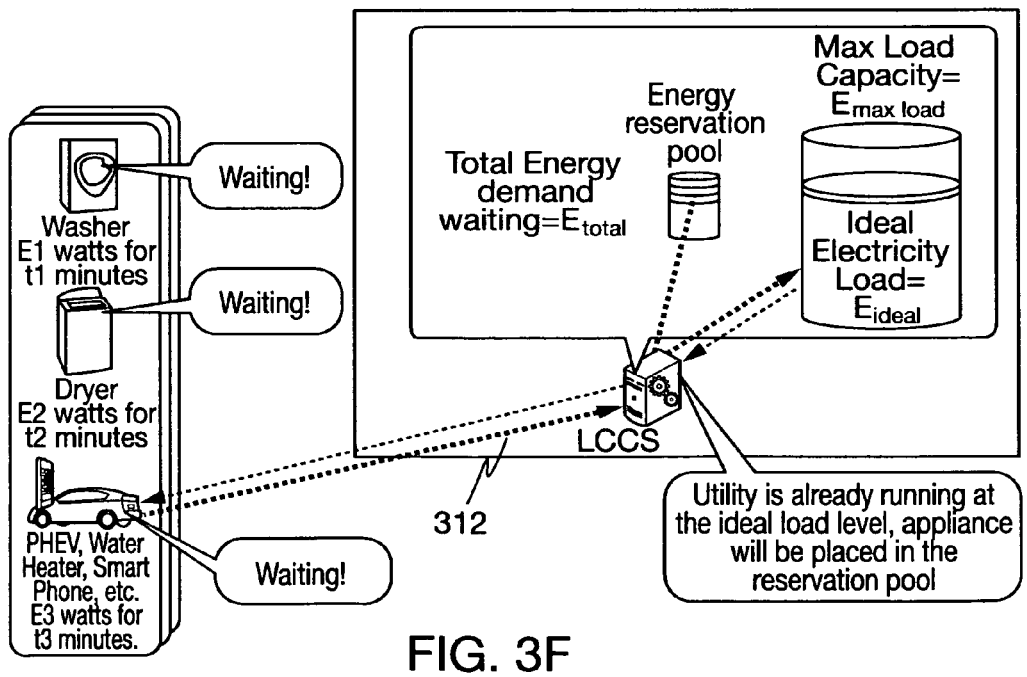
Figure 3G:
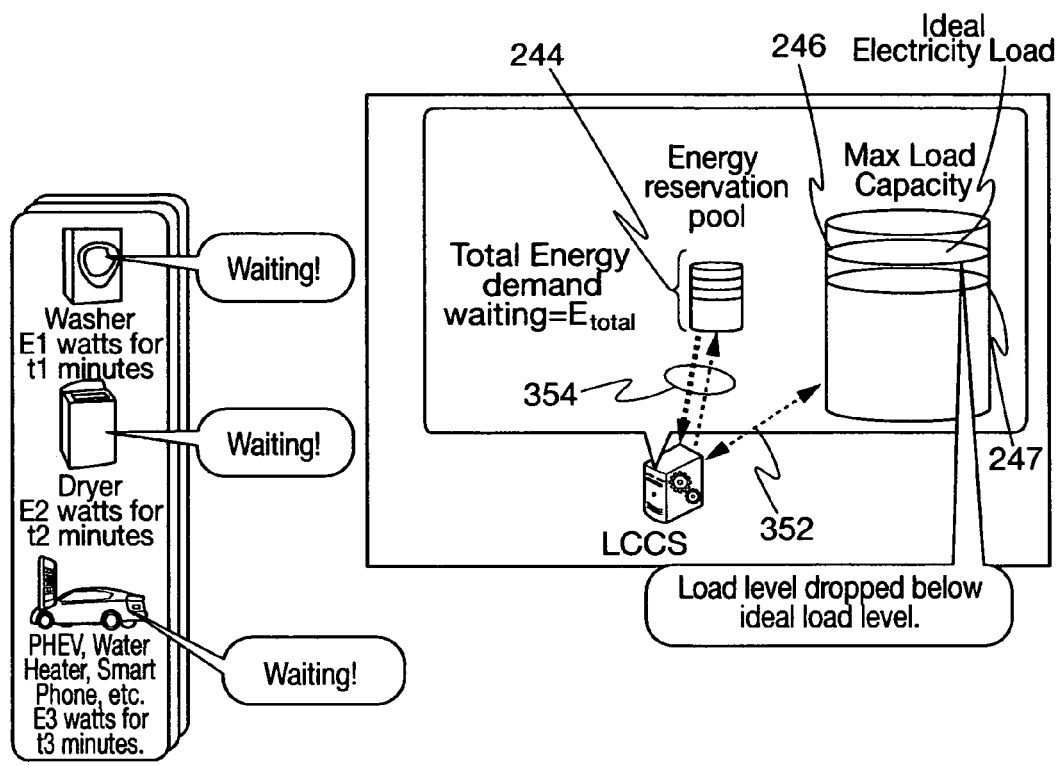
Figure 3H:
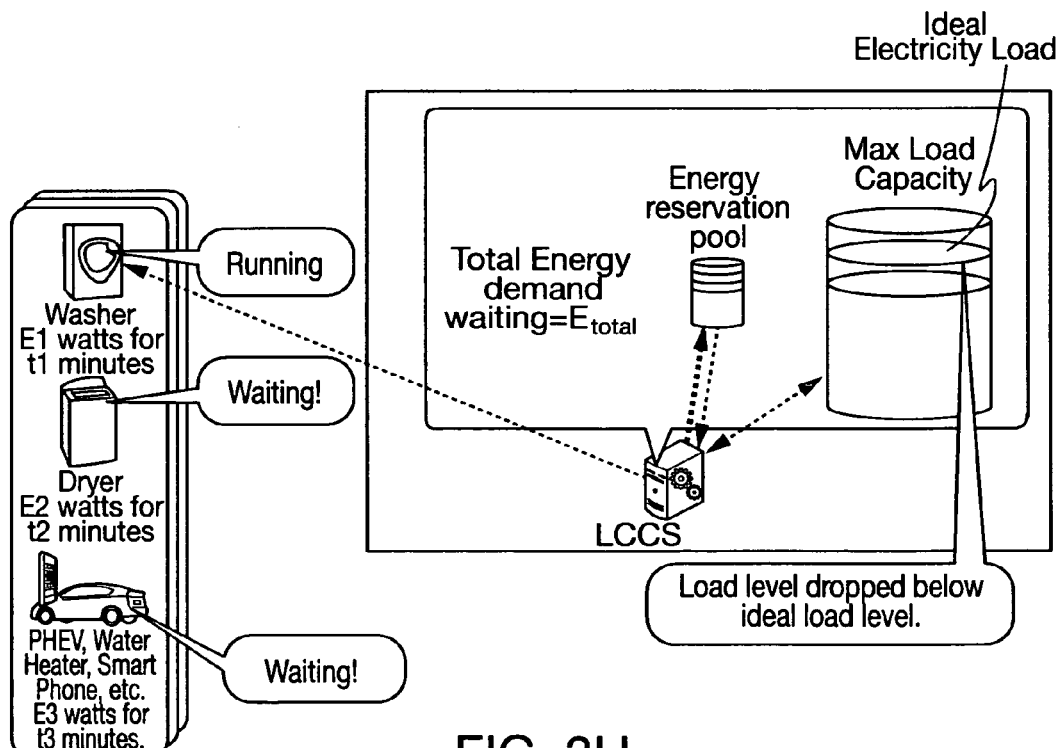
Figure 3I:
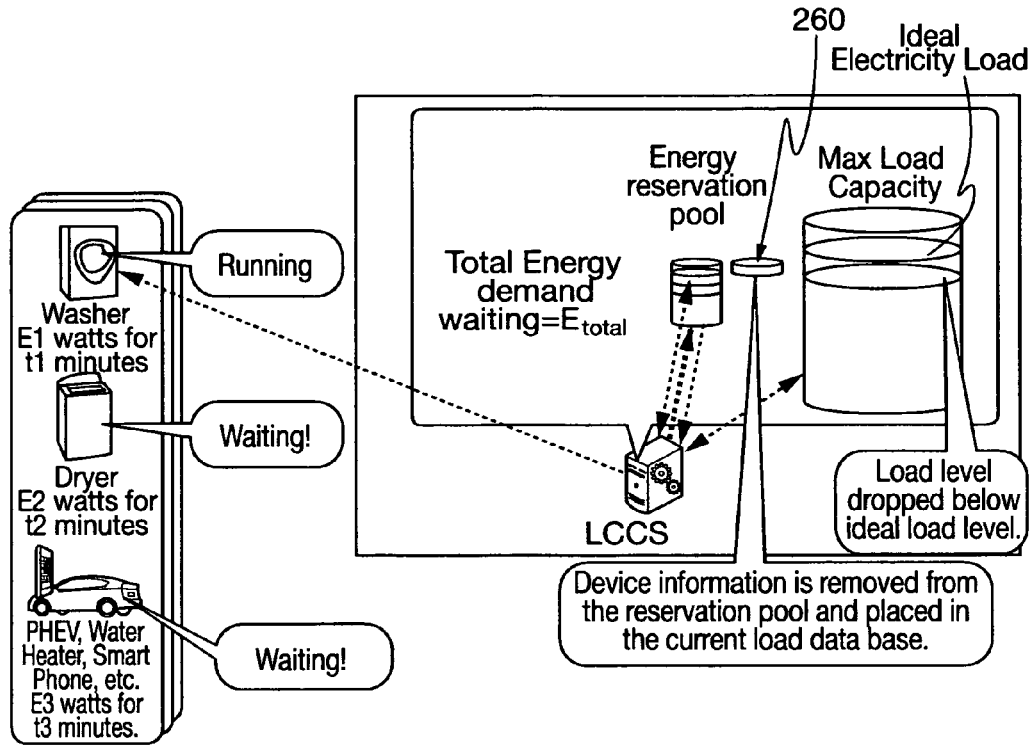
Figure 3J:
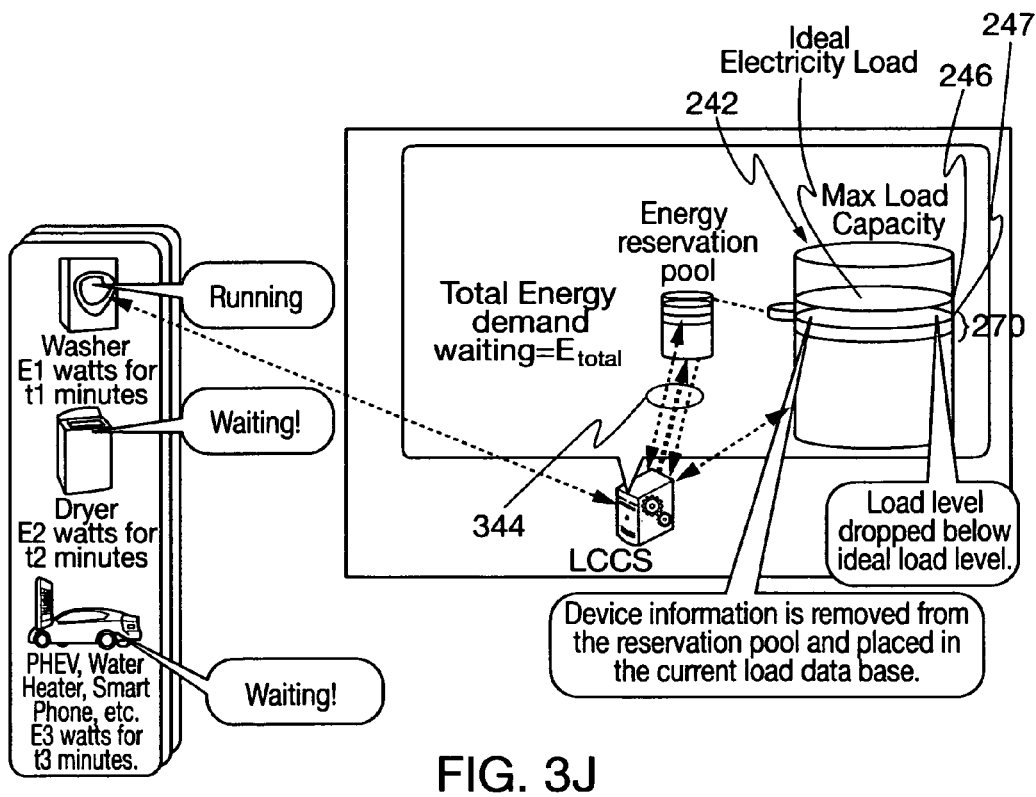
Figure 3K:
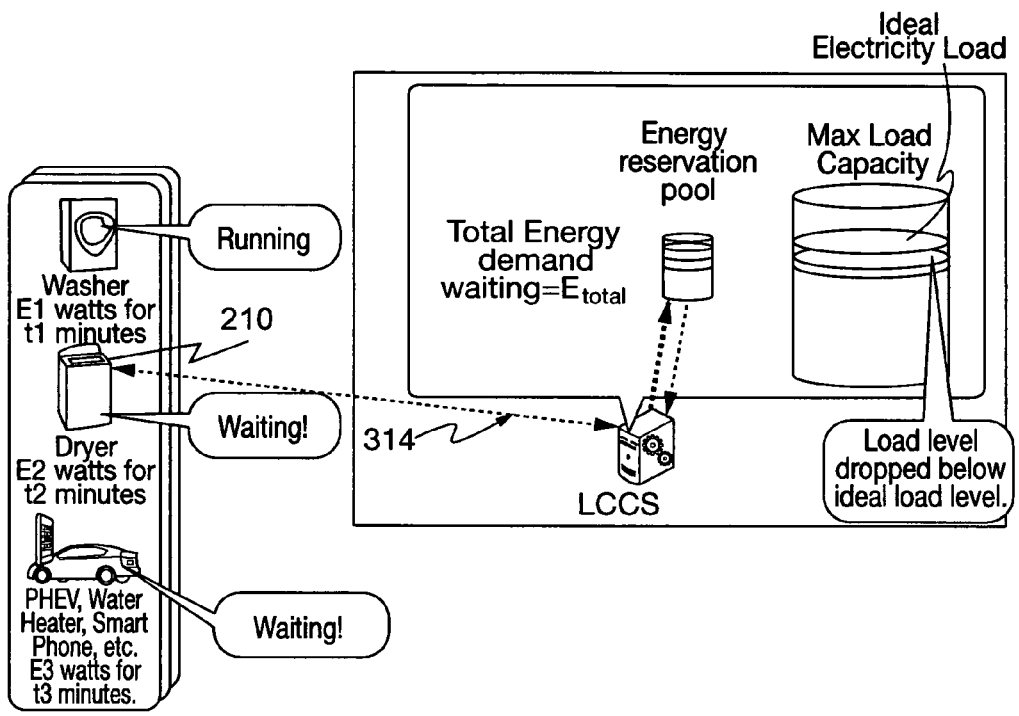
Figure 3L:
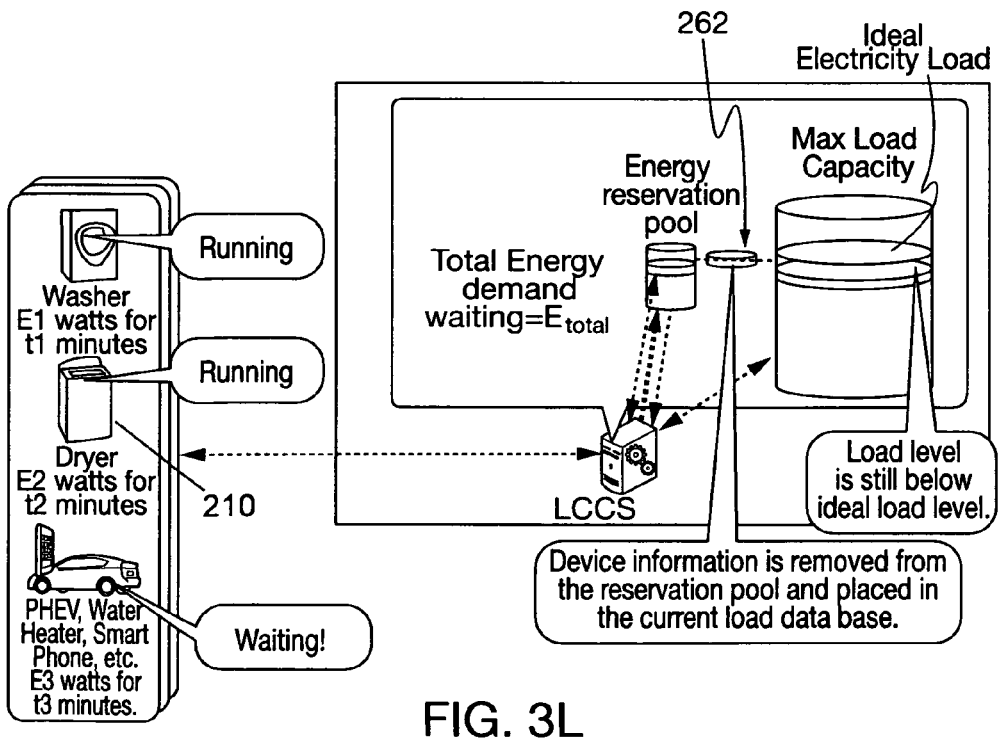
Figure 3M:
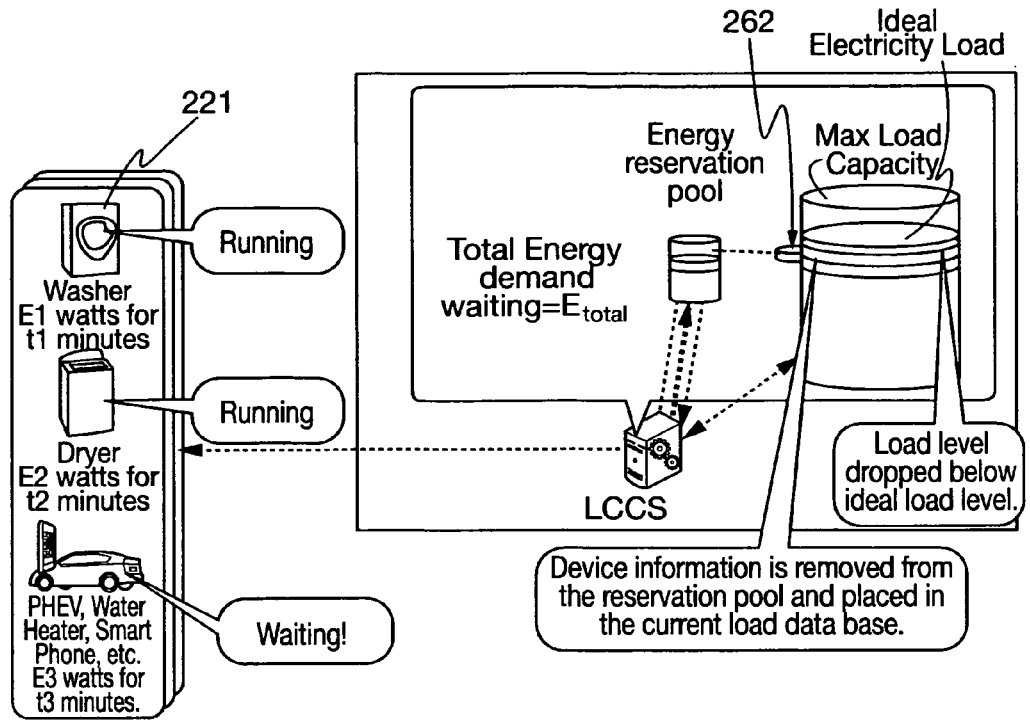
Figure 3N:
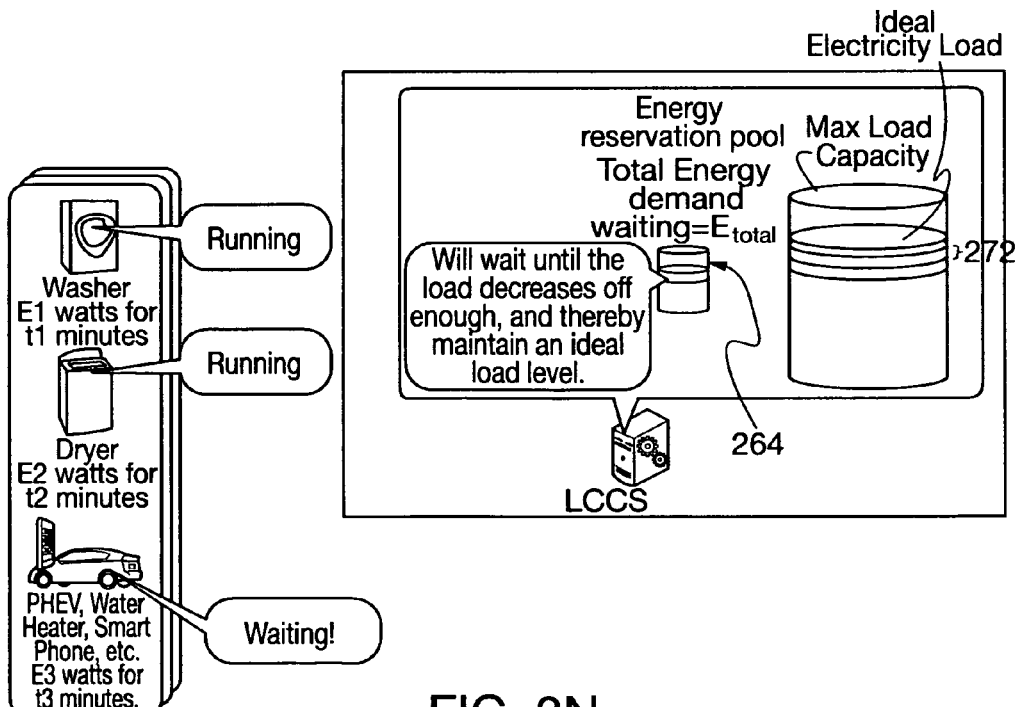
Figure 3O:
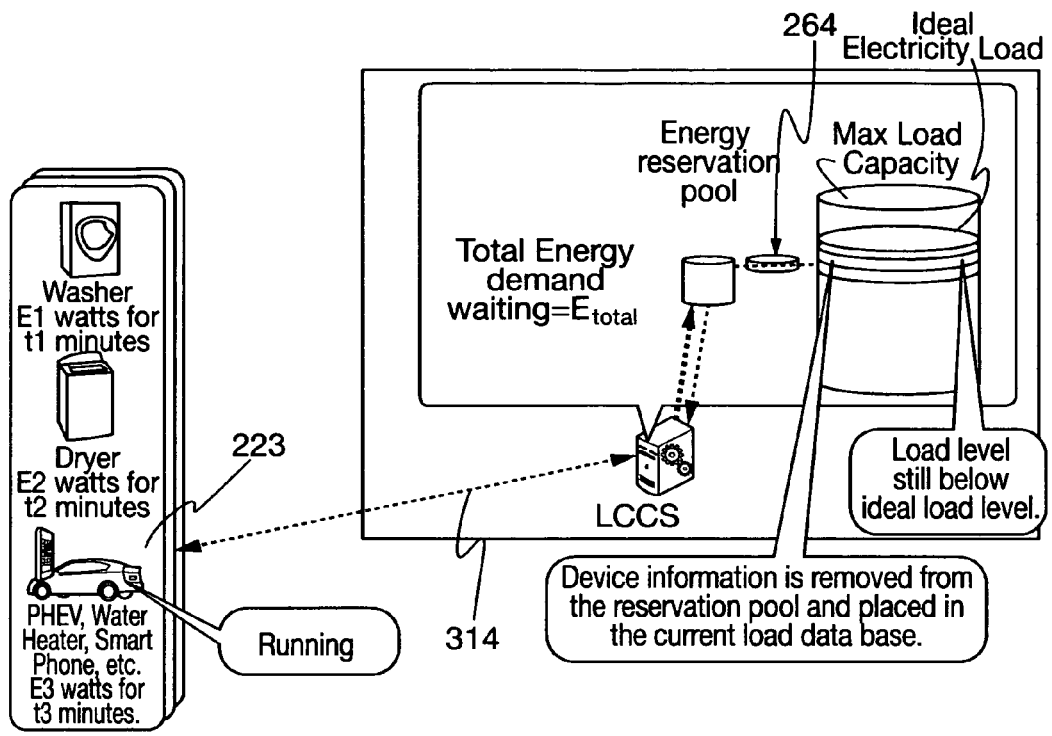
Figure 3P:
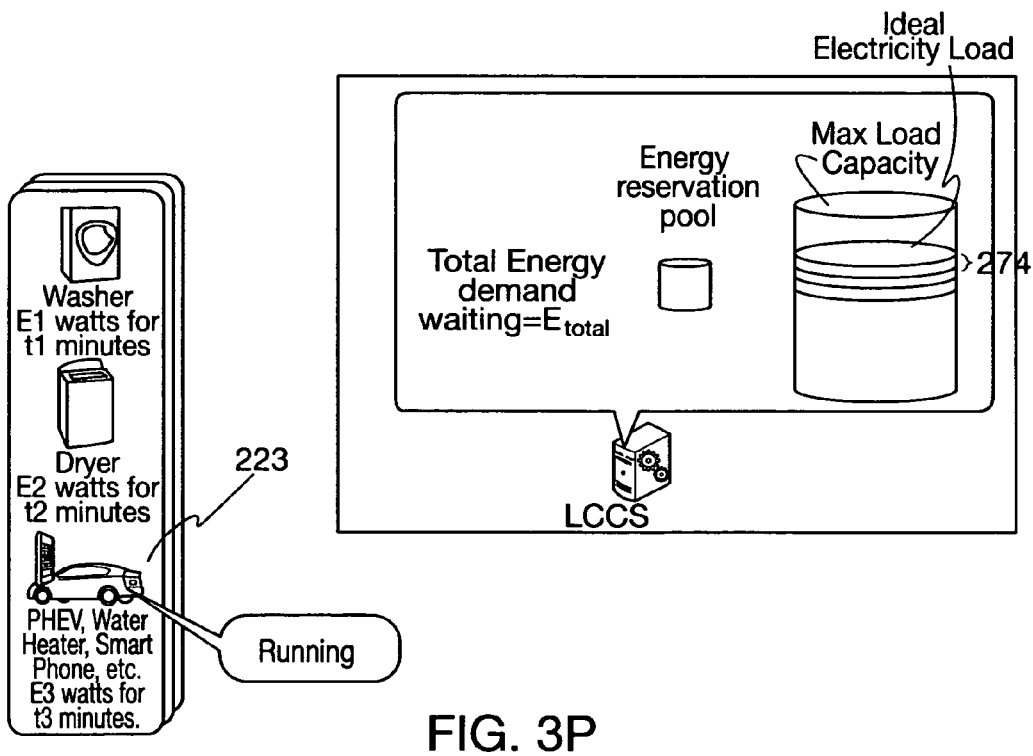
Figure 3Q:
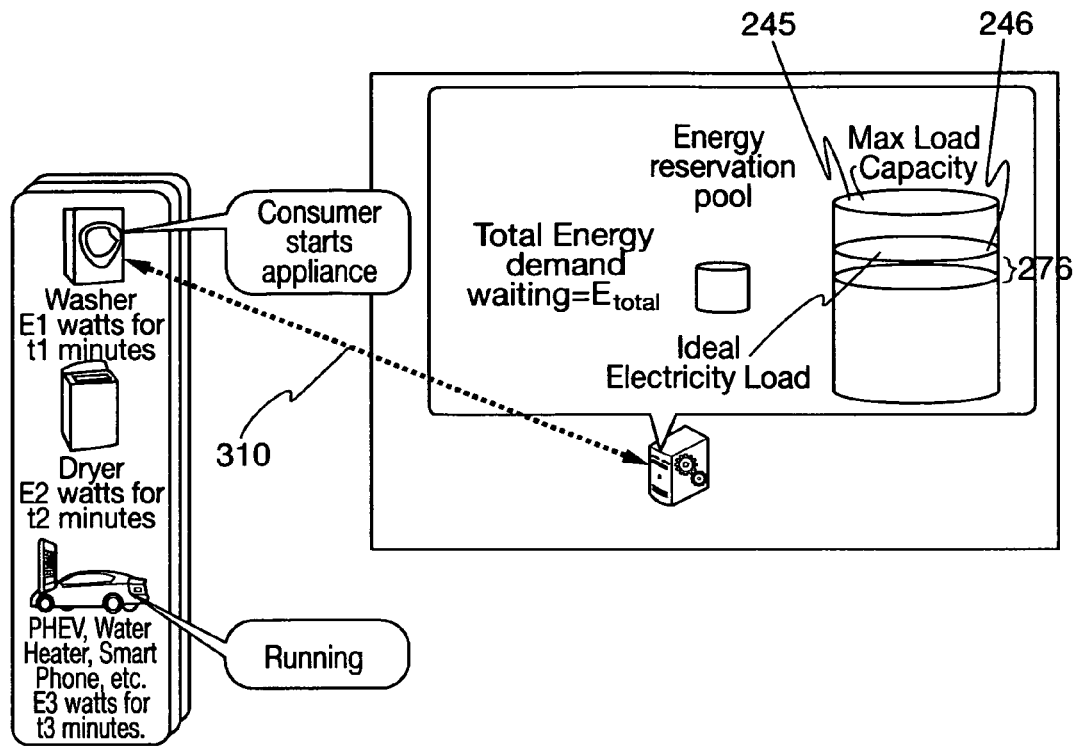
Figure 3R:
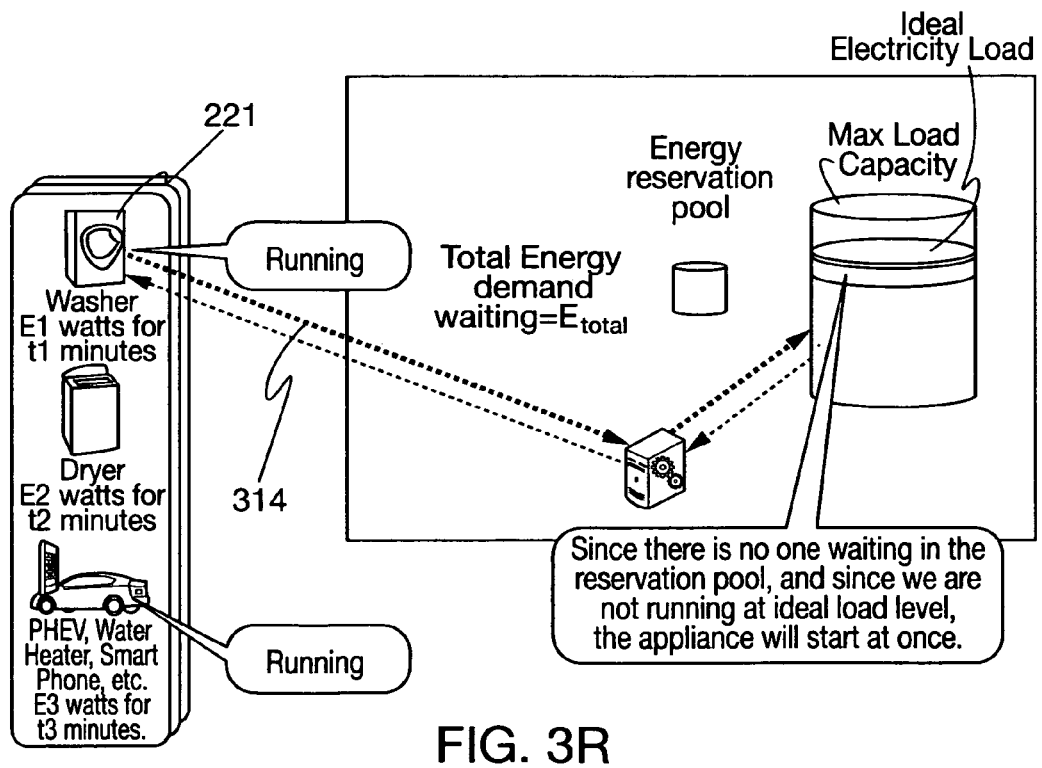

FIGS. 3A through 3R provide a more specific description of the operation of the DRA in connection with the steps provided in FIG. 2. These figures are provided in succession showing the operational sequence of the processing of start requests by the DRA according to one particularly preferred embodiment of the invention. As such, like elements within each of the figures are identically numbered where needed and the process steps with associated information flows are separately identified.

FIG. 3A shows customers 210 that have individual electric power consuming devices 220, such as a washer 221, a dryer 222 and an electric vehicle 223. DRA 250 includes a load control computer system (LCCS) 256 having computer server 254 and, associated databases 255. Within the server and databases are two data structures: an active pool 242 and a reservation pool 244. Active pool 242 contains a list of devices that are currently being provided with electrical service. Reservation pool 244 contains a queued list of devices that are waiting to be provided with electrical service. In the operation shown in FIG. 3A, the LCCS issues requests 302 to an ISO 274 or utility server 284 and receives responses 304. As shown in FIG. 3B, the received messaging may contain certain data regarding electric suppliers and/or the electric grid, from an ISO for example. Data so received may include the current electrical load 247, an ideal electrical load 246, and a maximum electrical load capacity 245. Other information may also be collected an input to the LCCS, either automatically or manually, such as local transformer loads, wholesale electricity prices, weather conditions and forecasts, temperatures, renewable energy production levels etc. At some point during the operation of the LCCS, a combination of events take place that require the LCCS to begin pooling device start requests. Examples of such conditions may include: devices requesting, via their policies, a certain wholesale price below that being offered, all devices between certain hours of peak operation, etc. Any conceivable combination of parameters can be established to commence pooling per combinations of the customer device policies, the service provider information and policies (if any) and the active pool parameter to be monitored and maintained.

In the example of FIG. 3B, the active pool parameter is the monitoring and maintenance of an ideal load level. In that figure, the actual electricity load 247 is illustrated as substantially close to the ideal electricity load as shown by the proximity of the two levels within the active pool. While the overall maximum electricity load capacity has not been reached, there is little room for adding additional devices while still maintaining an ideal load condition.

At FIG. 3C, the consumer starts electrical device 210 (an appliance) and a start request message is 310 is sent to the LCCS 256. Customer policy information regarding this device may have been previously configured and transmitted to the DRA for storage in its database 255. Nevertheless, the customer policy information may be changed or updated within the start request messaging. Specifically, the policy information may include the operational price point at which the device is specified to start, how much electricity is required for operation and for how long, and whether there is a latest start point or latest finish time (e.g. a plug-in hybrid electric vehicle needs to be charged and ready at 6:00 AM). The LCCS checks for and is returned the status of the current electrical load 247 vis-à-vis the ideal electrical load 246. Based on the evaluation of the active pool parameter, i.e. the proximity of the two levels, the LCCS makes a determination as to whether the requesting device should start immediately or be pooled. If that evaluation reveals that there is sufficient electrical capacity left to start the device while still remaining within a specified range of the ideal electrical load, and starting the device conforms complies with the customer policies, this is communicated to the customer with a start message 312 to start the device. If not, as shown in FIG. 3C, then the LCCS queues the device in the reservation pool for later start as shown as a first reservation pool entry 260. This is communicated to the customer with a message 312 indicating the pending status of the device along with a pool prioritization number and any other desirable notifications.

Although not shown in the example of FIG. 3C, the device start request may also be specified as having an immediate start request. In this instance, the above evaluation may not take place, but instead the LCCS may simply check to ensure that the maximum electrical load capacity 245 is not exceeded by starting the device and returning a start message provided that operation within the other system parameters is permitted.

At FIGS. 3D through 3F, additional consumer start requests are communicated to the LCCS. The same messaging and LCCS evaluations and conditional determinations are made as described with respect to FIG. 3C above. Since the actual electricity load and the ideal electricity load are still within the range of ideal operation, the devices are placed in the reservation pool again. This is shown as a second reservation pool entry 262, third reservation pool entry 264 and customer messaging 312 indicating the pending status and prioritization of the device. According to one particularly preferred embodiment, reservation pool entries preferably include all relevant information regarding the requesting device, e.g. device type, energy needed, operation duration, etc.

At FIG. 3G, there are now several devices waiting to be started. At some point, the LCCS determines that a system change has occurred that permits a certain amount of additional electrical load to be consumed and that some of the pooled devices should be started. Examples of such system changes may include a drop in wholesale electricity price, a transformer load drop, or an influx of additional power capability to the electrical grid. In any case, the pendency of pooled devices, which also depends on the customer policies established for these devices and the active pool parameter that is to be monitored, maintained or otherwise optimized, changes because of changes to these parameters. In the example of FIG. 3, let it be assumed that the customer policies specify an operation of these pending devices when electricity prices are not at their peak, for example during any operation at or over the ideal electrical load, in which case the utility charges peak rates for electrical utility service. As mentioned previously, the active pool parameter in this example is the operation of the utility at or within a range of an ideal electrical load.

Given these criteria and as shown in FIG. 3G, a drop in the current electrical load 247 takes place such that it drops significantly below the ideal load level 246. Here, the active pool parameter has been satisfied in that additional electrical demand may be placed on the electrical distribution system. Additionally, the resulting increase in available capacity may, in and of itself, result in a decrease in the price of wholesale electricity. Equally, the load may have dropped because the peak usage time has passed. Regardless, let it be assumed that the electric supplier price has also dropped such that the customer policies are satisfied as well. These two conditions, as evaluated and determined by the LCCS, are deemed satisfied through messages and associated steps 352. In this event, the LCCS then checks with the reservation pool 244 and sequentially selects devices waiting to start according to the their prioritization number. As provided in FIG. 3H, start messages are sent to device 221, the device next in queue according to the prioritization number, and the device runs and begins to consume electricity. As shown in FIG. 3I, first reservation pool entry 260 is removed from the reservation pool (along with its associated information) and added to the active pool 242, so as to become active pool entry 270 of FIG. 3J.

From FIG. 3J, it is shown that the actual electrical load 247 is still comfortably less than the ideal electrical load 246 as evaluated and determined by the LCCS through messaging and associated steps 354. I.e. the active pool parameter is still satisfied. Therefore, as provided in FIGS. 3K through 3N, the LCCS repetitively checks with the reservation pool 244 and sequentially selects devices waiting to start according to the their prioritization number. As with the operation described with respect to FIGS. 3I and 3J, start messages 314 are sent to devices 222 (FIG. 3K) and 223 (FIG. 3O), the devices next in queue according to the prioritization number. After receipt of these messages the smart socket or smart meter permits the devices to run and they begin to consume electricity (FIGS. 3L and 3P respectively). As shown in FIGS. 3L through 3N, second reservation pool entry 262 (FIG. 3L) is removed from the reservation pool (along with its associated information) and added to the active pool 242, to become active pool entry 272 (FIG. 3M). Similarly, FIGS. 3O and 3P, show third reservation pool entry 264 (FIG. 3O) being removed from the reservation pool (along with its associated information) and added to the active pool 242, to become active pool entry 274 (FIG. 3P).

As shown in FIGS. 3Q and 3R, the device start request 310 (FIG. 3Q) may also be specified in a scenario in which there are no waiting devices in the reservation pool. Further, there is electrical load overhead 276 in the active pool such that the active pool is not running at or within a specified range of the ideal electrical load. In this case, LCCS may issue an immediate start request 314 (FIG. 3R) and place the device directly in to the active pool and a start message 314 is sent to the device 221. As with the case of forced immediate starts through policy selection, the LCCS may simply check to ensure that the maximum electrical load capacity 245 is not exceeded before starting the device and returning a start message provided that operation within the other system parameters is permitted.

Thus, the apparatus and methods of the present invention store demand instead of actual electricity to achieve more efficient electricity generation and distribution.

A more detailed description is provided below with respect to the queuing and prioritization of devices collected within the reservation pool according certain preferred embodiments of the invention. As a first matter, customers' device profiles typically take the highest priority within the evaluation step and as compared to the service provider policies and the active pool parameter to be optimized. E.g. if an electronic vehicle is set to be ready at 7:00 AM for commuting to work, it has to be ready at that time regardless of price. In order to optimize such a request while still accommodating price sensitivity in the customer policies, as well as maintaining the active pool parameter, the system may calculate a latest start time so that the end charging point is reached in time. In an ideal case, this is shared with the smart socket to guard against future network failure. In this example, if the latest start time is determined to be 1:00 AM, the LCCS now uses that time to place that device in an appropriate slot among the devices in the reservation pool and assigns it a corresponding prioritization number. The LCCS may then also use the recorded load profile for that device when it decides how to bundle it with other devices that may be starting at or near the same time. Various mathematical algorithms may be used to determine how best to match all the load curves, In any event, the prioritization holds as long as the devices are started before their latest calculated start time as specified in the prioritization list.

When such specific customer profile timing preferences are not provided, the reservation pool may be operated as a flat pool based on a first-come, first-served prioritization, possibly according to other customer policies. In this prioritization scheme, consumer's policy choices again govern which classes they are put into on the first come first serve basis. For example, if the customer policy function provides for a cheapest electrical power price, then they may be placed in queue and assigned a start slot within the cheapest time slot on a first-come, first-served basis. This option still provides the electric service provider with some ability to control which device will start and when, either based on subsequently evaluated load profiles or as a secondary consideration such that the active pool parameter is optimized. While the customer can still request immediate start functions, they are otherwise queued by the LCCS to be compliant with the goal of the active pool parameter.

Active pool parameters, i.e. those monitored, evaluated and deemed satisfied by the LCCS, may include parameters other than an ideal electrical load described in connection with FIGS. 3A-3R above. Active pool parameters can be defined as global, regional, individual or manual within the software of the present invention. A global peak time active pool parameter may be specified, for example, that specifies that every new start request should be sent to the reservation pool, as permitted by individual profiles, between the peak electrical power use times of 5:00 PM and 7:00 PM. In this instance, the margin between the maximum electrical load and the actual electrical load is being optimized and or maintained within a range by the LCCS so as to avoid power grid overload scenarios. Another global parameter envisioned is a global price parameter from an ISO. In this example, a global request is made to send new start requests to the reservation pool, as permitted by individual profiles, when the wholesale price of electricity per megawatt from the ISO is above $50. In this instance the cost of electricity to the ISO, which purchases power from the utilities, is the active pool parameter to be optimized or maintained within a margin by the LCCS so that overall cost management is executed at the costs to the ISO are contained. One regional parameter that may be used at local grid loading points is a troubled component or overload parameter. This parameter may take the form of forcing all new start requests to the reservation pool, as permitted by individual profiles, so as to avoid tripping a certain load condition, for example on a regional distribution substation or transformer sub-system. In this instance the devices remain in the reservation pool until certain regional power margins are restored and maintained above a certain level and/or additional suppliers come on-line that bypass the troubled component. Finally, individual parameters can be configured within the specialized electrical use programs offered by the ISO or the utility. In this instance, there may be more than one active pool parameter being optimized by the LCCS. I.e. the LCCS may be optimizing and monitoring an ideal power level but may override this if a certain quantity of green energy suddenly becomes available and there is a waiting pool of customers that have specified a preference for such use in their customer profiles regardless of time and cost considerations. It should be appreciated that many other parameters and combinations of active pool parameters exist.

Although one specific example has been provided in FIGS. 2 and 3A-R above, it should be appreciated by those of skill in the art that the customer policies may be more sophisticated than simply specific an electricity price point at which to start a device. Other examples of consumer configurable start/stop parameters include, but are not limited to:

- A price or price range at which the consumer desires to operate or start the device.
- A latest device start time, or guaranteed finish time at which the device should be done charging or running.
- Any dynamic pricing options made available to the customer.
- An energy source preference, such as a preference to run on electricity from a green energy supplier, or any other specified electrical service provider.
- A stored or local energy source preference, such as a preference to run certain devices on local battery power at peak hours or during time periods in which electricity is more expensive.

Similarly, where permitted by the managing authorities and configured by the LCCS, it should be appreciated by those of skill in the art that service provider policies may also be specified to so as to be taken into consideration in the LCCS' evaluation of the devices within the reservation pool to be started. Examples of electric service provider (utility or ISO) configurable start/stop parameters include, but are not limited to:

- Permitting/denying the start individual devices based on price points and other attributes set by the consumer.
- Permitting/denying the starting of batches of devices based on type, "finish by" time, "start by" time or other attributes set by the consumer.
- Permitting/denying a forced immediate start.
- Permitting/denying starting of batches of specific devices in order to run as close to a specific load level, possibly at a lower service price. This may be so even though the service provider may have lowered the price for specific batch starts while maintaining a different electrical supply price for everyone else.
- Permitting/denying starting according to cost and environmental efficient savings profiles for various consumers: e.g. differentiating small, medium, large households and businesses; differentiating hot and cold climates; differentiating types of customers within a class (e.g. families with household pets that require specific or minimum thermostat settings for the day); customer convenience profiles (e.g. permitting the starting the dishwasher in the morning so it will be done before the new peak pricing but also causing the flow of hot water so that water is not wasted in the shower while the customer waits for it to warm).
- Permitting/denying start/stop differentiation by customer types, e.g., business versus residential consumer.
- Permitting/denying differentiation order of service demand (e.g. first-come, first-served or equivalently first-in-first-out—FIFO).
- Permitting/denying differentiation according to preferred geographical service districts.
- Permitting certain devices to start for a short period before being stopped and then later restarting them based on previous described profiles. This is to accommodate some local power regulations that don't allow or adhere to some of the full delay aspects of the present invention.

Notices, data streaming and other messaging not directly associated with the starting and stopping of devices may also be provided as part of the present invention. Some of these data are shown in steps 166-168 of FIG. 2 and throughout FIGS. 3A-R. Examples of messaging or data streams provided to or from the customer include but are not limited to:

- Providing notification of certain events and status (e.g. with SMS, email or other electronic notification):
  - Device starts/stops status (device has now started/stopped);
  - An estimated start time based on present calculation of parameters and settings (e.g. device will start at approximately 2:45 PM or will start in approximately 45 minutes);
  - An estimated stop time based on present calculation of parameters and settings (e.g. device will stop at approximately 3:50 PM or will stop in approximately 1 hour and 5 min.);
  - An estimated cost of running the device from start to finish at a particular price point; and
  - An ability to remotely control start/stop of the device, possibly based on changed parameters of the system of which the consumer is advised (e.g. the power price goes up while the user is away from home due to power shortages/brown-out conditions and consumer wishes to shut off certain devices).
- Messaging and streaming of device types and operational details (e.g. washing machine present temperature, operating cycle type, load size, brand, model/serial number etc.)

Examples of messaging or data streams provided to or from the DRA and/or electrical service provider include but are not limited to:

- Notifications:
  - Wholesale electricity price changes;
  - Estimated device start times, estimated device stop times, and the estimated cost of running the devices from start to finish; and
  - Comparative information regarding devices, e.g. advising the consumer about how their specific device compares to other similar devices in terms of energy efficiency, recalls, replacement promotions, what they would be able to save running it at other times of the day (weekly, monthly, yearly savings).
- Statistical analyses—the DRA/service provider can save information about each device and its operation, from the customer device or the manufacturer, for future statistical analysis (e.g. predicting failure or for optimizing operational functions). Examples include collecting:
  - Previous start and stop times for each device;
  - Previous electricity consumption for each device; and
  - Manufacture specified runtime, electrical consumption, average working lifetime, recommended maintenance intervals etc.
- Marketing and Advertising—the DRA/service provider can sell information and statistical operation of devices back to device vendors about real life usage characteristics and performance. Further, the utility can sell targeted advertisement information about who might need a replacement device and/or what savings may result from using a different device or newer model device.

As a side consideration, if the DRA or service provider is provided with the real-time status of operating devices in the form of these notifications, messages and data streams, the electric service provider would also conceivably have the option to notify consumers about unusual behavior during operation, e.g. if the stove/coffee machine/etc. is left on for an unusual amount of time. Such notices may be part of an intelligent knowledge database within the LCCS or service provider computer systems that performs higher level notice functions. In the example above, information regarding the device being on may be correlated with other electrical usage information about other devices, such as detection that there are no lights on in the house and/or the car is not plugged in for charging (i.e. no one is home). In this manner potentially dangerous situations may be detected and remedial action taken, by calling a security company or notifying the customer of the same.

As a further aspect of the invention, the LCCS may also employ higher order device information to start devices in an intelligent way. Specifically, an embodiment is envisioned in which the load curve for each device in the reservation pool is used condition start/stop operations. In one application, the load curves are used to estimate which devices should be starting at the same time or which devices should be delayed certain increments of time from one another. For example, a restaurant that attempts to start a large number of dishwashers simultaneously may not provide the best electric power demand profile to the service provider due to power cycle fluctuations in each individual dishwasher cycle. For example, the heating element at the cycle finish uses more electricity than other dishwasher functions at the cycle beginning. One way the LCCS handles this, is to take the load curve for each device and split it up into convenient time segments, and from that calculates the most evenly distributed load curve for a particular amount of electrical power that the utility wishes to provide over a given time. The LCCS can also be told to start devices in a way that optimizes not just one consumer's local grid use, but the total power grids' load curve so that it is as close to a given load level as possible with all the customers under its control.

As another aspect of the invention, a two-way smart socket is envisioned as being used in the system described above. This socket may adhere to any of the home connectivity standards, such as ZigBee™, for its communication connectivity. These smart sockets are envisioned as being capable of performing the following functions:
1. Receiving and sending requests and information among the smart socket, a smart socket server at the premises and DRA to perform the following actions:
   a. Start Request—Detect that an attached electrical device wants to start via a current draw detection device (e.g. the consumer pushes start on the dishwasher or plugs in his Electric Car). In a particularly preferred embodiment a Kelvin module or Hall-effect device may be used to detect this event.
   b. Send Request—transmission to the smart socket server or on-premises computer and ultimately to the DRA that the device wants to start.
   c. Data Stream—streaming of real-time electrical usage data to the smart socket server (at the premises and the DRA) so as to create an electrical usage profile for the device. This would also permit later identification by the smart socket server as to where the device is in its usage cycle, or for the purpose of identifying similar devices at other consumers and compare their efficiency rates etc.
2. Receive and carry out commands received over the on-premises network:
   a. Start/Allow—start/allow electrical current to the device attached to a smart socket.
   b. Wait—wait for device start until a start command is received or revert to the start/stop profile from the on-premises server.
   c. Stop—stop electrical flow to device attached to smart socket.
   d. Offline Profile—receive and store a start/stop or pool profile that is to be used in case of network failure or in cases where real-time communication with the DRA is not possible or to otherwise minimize/optimize related network traffic.
3. Paring—providing interconnectivity with ZigBee™ or similar wireless at the smart meter or home gateway.
4. Safety monitoring—detection of erroneous requests for starts such that the smart socket won't allow current to flow unless a bona fide device is requesting service (e.g. a child safety involving outlets).
5. Override button—providing an immediate bypass feature in which all queues are bypassed so as to start the device immediately.
6. NFC or RFID chip—physical detection capability through other wireless connectivity standards for use in determining device start/stops. For example, the car is detected as being in the garage but is not plugged in. In this feature, a notice could be sent to the customer so as to remind them that the car needs charging before the next use. Additionally, customer presence may also be detectable so that that personal device use profiles may be adjusted accordingly. E.g. the customer comes home early so the water heater needs to be started earlier than the default customer presence profile.
7. Device Communication—receiving actual charge level from a device, e.g. car battery, to help estimate required charging time. This can be based on the charging resistance of the device's battery based on its profile or via direct communication with the device itself.

In operation and with respect to FIGS. 1 and 2, the home gateway or smart socket don't necessarily have to communicate with the smart socket server each time it needs to determine if it can start a device upon detecting a start request from the attached device. The smart socket server can transmit a message to all smart sockets and home gateways that allows them to pool all the devices, locally, for start within a time period. This may be accomplished in advance of forwarding any pooling or start request messages to the DRA. As an example, forward notice from the DRA may be provided to the on-premises server that all devices are to be queued at 5:00 PM. The server may store the devices so queued at that time for later delivery to the DRA if needed, particularly if network communication to the DRA is down. Bidirectional communications, both within the premises and as between the premises and the DRA, can then be optimized and minimized. Further, networking transmission difficulties and errors in communication with the DRA can be minimized in that the smart socket server can communicate locally with the smart sockets after queuing DRA information so that devices will start even if the off premises network is down.

The smart socket and on-premises smart socket server can also be integrated into a smart circuit breaker. By moving the functions to the circuit breakers, the need to place controlling smart sockets at each participating device is obviated thereby saving money and avoiding more numerous device operation issues. In this case, power control is envisioned as being managed at the smart circuit breaker instead of at the individual device location.

From a business perspective, companies are vying to take advantage of the enormous capital being invested in the smart grid energy sector. The solution of the present invention solves many of the niche problems present with this sector. Unlike individual power-saving devices for individual home use, LCCS is designed to operate continuously so as to manage power draws through reservation pooling based on the consumer's specific device profile. Managing and tracking those specific delayed devices in a real time within a reservation pool also allows for the use of the LCCS system for real time power ramping and load profile shaping. DRAs are expected to accumulate negative watts through these power demand delays, which may in turn be sold back to the wholesale market, as if the DRA was a power generator itself. In essence, consumers are paid by the ISO to save money and the environment by automatically pooling and moving dynamically configurable electrical loads to off-peak operation times, such as electric vehicles, electric water heaters, and pool-pumps.

Current demand response technology relies on manual intervention by the consumer or interruptible remote utility shutoff to reduce energy consumption. Several major problems are inherent in these solutions. For example:

The average consumer will not be bothered with constant monitoring of their energy consumption to make the necessary changes to increase conservation.

The consumer will does not have to react in real time to fluctuating energy prices and indeed may not even understand them or the need to react.

Consumers will eventually require quick chargers or even Level 3 charging stations to power larger electrical devices such as electric vehicles. The current infrastructure in many residential neighborhoods may not be able to power these without advanced power management systems.

As more electric vehicles are added to the grid, consumption will soar and responding to charging requirements will become critical to avoiding brown outs and other problems due to this huge energy demand. Utilities are acutely aware of this pending problem and see no solution in sight to manage it.

More difficult to schedule renewable energy will gradually replace easy to schedule fossil fuel energy generation.

The present invention thus eliminates the problem of user intervention to react to new energy rates, one of the biggest deterrents to energy conservation. It also provides for remote management of occupied and unoccupied properties, such as vacation homes, via the Internet and mobile devices in a further effort to solve this problem.

It should be appreciated that the present invention is not limited to the pooling of electrical power requests for satisfaction by an electric power utility. Those of skill in the art may apply the general concepts of the present invention to any utility consumption (e.g. natural gas, water, network bandwidth management, etc.) in which a dynamic utility supply and consumer demanded utility load may be negotiated as between a supplier and consumer so as to prioritize and optimize the utility delivery according to various criteria selected by either of or both of the supplier(s) and consumer(s).

While the invention has been shown and described with reference to specific preferred embodiments, it should be understood by those skilled in the art that various changes in form and detail may be made therein without departing from the spirit and scope of the invention as defined by the following claims.

What is claimed is:

1. An electric power distribution system for scheduling electric power distribution, said electric power distribution system including a plurality of computers, each of said computers within said electric power distribution system including a processor and associated memory from which computer instructions are executed by an associated processor, said electric power distribution system comprising:

an electric power customer having at least one computer-controlled device that consumes said electric power, said computer-controlled device being scheduled to start according to a policy set by said customer and issuing a computer-based start request message according to said policy;

an electric power provider for supplying said electric power to said computer-controlled device; and a load control system coupled to said customer and said provider, said load control system receiving said computer-based start request message, said load control system having an active pool data structure containing a group of computer-controlled devices for which computer-based start request messages have been received and for which said associated computer-controlled devices have been started by said load control system for said customer, said load control system having a reservation pool data structure containing a group of computer-controlled devices for which computer-based start requests have been received and for which said associated computer-controlled devices have not been started by said load control system for said customer, said load control system establishing an active pool parameter according to which said active pool data structure and said reservation pool data structure are managed in connection with said customer policy data, said load control system detecting a change in one of said start request messages associated with said devices within said reservation pool data structure, said start request messages associated with said devices within said active pool, or said active pool parameter, and moving at least one device from said reservation pool data structure to said active pool data structure based on said change and sending a computer-based start message associated with said at least one device to said customer so as to start said at least one device based on said chance.

2. The system of claim 1 wherein said customer policy includes one of: a price policy, a latest device start time, a guaranteed finish time, an energy source preference, and a local energy source preference.

3. The system of claim 1 wherein said active pool parameter is one of: an ideal electric power load level, an energy source preference, an electricity price limit, a margin between a maximum electrical load and an actual electrical load, and a geographic load consideration.

4. The system of claim 1 wherein said active pool parameter is an ideal electric power load provided by said provider and said active pool parameter is satisfied when a total power for all devices within said active pool is within a range of said ideal electric power load.

5. The system of claim 1 wherein said devices with outstanding start requests within said reservation pool are processed in the order in which they are received by said reservation pool.

6. The system of claim 5 wherein said customer policy overrides said processing order.

7. The system of claim 1 wherein said unprocessed devices within said reservation pool are processed according to a latest device start time and a subset of said devices in said reservation pool having outstanding start requests are processed depending upon a change in electric power price.

8. The system of claim 1 wherein said load control system accounts for a load curve in determining whether said customer policy is satisfied.

9. The system of claim 1 further comprising a supplier policy stored within said electric power distribution system, said supplier policy including one of: a customer type, a geographic preference, a price policy, an energy source preference, and an environmental consideration.

10. An electric power, load control system, said system including a plurality of computers, each of said computers within said system including a processor and associated memory from which computer instructions may be executed by said processor, said system comprising:
 a load control system coupled to an electric power customer having at least one computer-controlled device that consumes electric power, said computer-controlled device being scheduled to start according to a policy set by said customer and issuing a computer-based start request message according to said policy; said load control system also coupled to an electric power provider that supplies said electric power to said computer-controlled electric device, said load control system receiving said computer-based start request message, said load control system having an active pool data structure containing a group of devices for which computer-based start request messages, have been received and for which said associated computer-controlled devices have been started by said load control system for said customer and a reservation pool data structure containing a group of computer-controlled devices for which computer-based start requests have been received and for which said associated computer-controlled devices have not been started by said load control system for said customer, said load control system establishing an active pool parameter according to which said active pool data structure and said reservation pool data structure are managed, said load control system detecting a change in one of said start request messages associated with said devices within said reservation pool data structure, said start request messages associated with said device within said active pool data structure or said active pool parameter, and moving at least one device from said reservation pool data structure to said active pool data structure based on said change and sending a computer-based start message associated with said at least one device to said customer so as to start said at least one device based on said change.

11. The system of claim 10 wherein said policy of said customer includes one of: a price policy, a latest device start time, a guaranteed finish time, an energy source preference, and a local energy source preference.

12. The system of claim 10 wherein said active pool parameter is one of: an ideal electric power load level, an energy source preference, an electricity price limit, a margin between a maximum electrical load and an actual electrical load, and a geographic load consideration.

13. The system of claim 10 wherein said active pool parameter is an ideal electric power load provided by said provider and said active pool parameter is satisfied when a total power for all devices within said active pool is within a range of said ideal electric power load.

14. The system of claim 10 wherein said devices with outstanding start requests within said reservation pool are processed in the order in which they are received by said reservation pool.

15. The system of claim 14 wherein said customer policy overrides said processing order.

16. The system of claim 10 wherein said unprocessed devices within said reservation pool are processed according to a latest device start time and a subset of said devices in said reservation pool having outstanding start requests are processed depending upon a change in electric power price.

17. The system of claim 10 wherein said load control system accounts for a load curve in determining whether said customer policy is satisfied.

18. A method of scheduling electrical power distribution within an electric power distribution system, said system including a plurality of computers that implement an electric power, load control system, each of said computers within said load control system including a processor and associated memory from which computer instructions may be executed by said processor, said load control system coupled to an electric power customer having at least one computer-controlled device that consumes electric power, said computer-controlled device being scheduled to start according to a policy set by said customer and issuing a computer-based start request message according to said policy set by said customer; said load control system also coupled to a electric power provider from which said computer-controlled device receives said electric power, said load control system having an active pool data structure containing a group of computer-controlled devices for which computer-based start request messages have been received and for which said associated computer-controlled devices have been started by said load control system for said customer and a reservation pool data structure containing a group of computer-controlled devices for which computer-based start requests have been received and for which said associated computer-controlled devices have not been started by said load control system for said customer, said load control system establishing an active pool parameter according to which said active pool data structure and said reservation pool data structure are managed, said method comprising:
 receiving at said load control system a computer-based start request message from said at least one computer-controlled device according to said policy;
 placing said at least one computer-controlled device in said reservation pool data structure for starting said device according to said policy and said active pool parameter;
 detecting a change in one of: said start request messages associated with said devices within said reservation pool data structure, said devices associated with said active pool data structure or said active pool parameter;
 moving said at least one device from said reservation pool data structure to said active pool data structure upon detecting said change; and
 sending a computer-based start message associated with said at least one device to said customer so as to start said at least one device.

19. The method of claim 18 wherein said step of processing includes the steps of establishing a range of operation about said active pool parameter and determining that said active pool parameter is satisfied when the movement of said device to said active pool allows the active pool to operate within said range.

20. The method of claim 18 wherein said step of placing includes the step of ordering said device for processing within said reservation pool in the order in which they are received by said reservation pool.

21. The method of claim 20 wherein said step of ordering includes the step of overriding said processing order based upon a latest start time in said customer policy.

22. A non-transitory, machine-readable storage media having executable instructions for causing a plurality of processors within a plurality of computers to perform a method of scheduling electrical power distribution within an electric power distribution system, said system including a plurality of computers that implement an electric power, load control system, each of said computers within said load control system including a processor and associated memory from which computer instructions may be executed by said processor, said load control system coupled to an electric power customer having at least one computer-controlled device that consumes electric power, said computer-controlled device being scheduled to start according to a policy set by said customer and issuing a computer-based start request message according to said policy set by said customer; said load control system also coupled to a electric power provider from which said computer-controlled device receives said electric power, said load control system having an active pool data structure containing a group of computer-controlled devices for which start computer-based start request messages have been received and for which said associated computer-controlled devices have been started by said load control system for said customer and a reservation pool data structure containing a group of computer-controlled devices for which computer-based start requests have been received and for which said associated computer-controlled devices have not been started for said customer by said load control system, said load control system establishing an active pool parameter according to which said active pool data structure and said reservation pool data structure are managed, said machine-readable storage media having steps for performing the method of:

receiving at said load control system a computer-based start request message from said at least one computer-controlled device after being scheduled to start according to said policy;

placing said at least one computer-controlled device in said reservation pool data structure for starting said device according to said policy and said active pool parameter;

detecting a change in one of: said start request messages associated with said devices within said reservation pool data structure, said devices associated with said active pool or said active pool parameter;

moving said at least one device from said reservation pool data structure to said active pool data structure upon detecting said change; and sending a computer-based start message associated with said at least one device to said customer to start said device.

* * * * *